United States Patent Office 3,269,860
Patented August 30, 1966

3,269,860
TREATMENT OF PAPER WITH LATEX COMPOSITION
Spencer M. Richardson, Green Acres, Pa., and Richard C. Hoch, Wayland, Mass., assignors to W. R. Grace & Co., Cambridge, Mass., a corporation of Connecticut
No Drawing. Filed Apr. 3, 1963, Ser. No. 270,151
8 Claims. (Cl. 117—155)

This invention relates to a latex composition for treating paper to improve its physical properties and to the products produced thereby. In one particular aspect, it relates to a composition comprised of a rubber latex and an adduct of an isocyanate for treating porous cellulosic paper to improve its physical properties.

Latices are used in large volume as impregnants for many special-purpose papers to provide one or more of the following properties: grease and oil resistance, increased wet strength, greater elongation, improved edge tear, higher tensile strength, improved internal bond (delamination resistance), increased internal tearing resistance and chemical resistance.

The typical impregnating paper has a loose porous structure. It is generally manufactured from rope, rags, cotton, sulfite, and high alpha cellulose content pulp. These raw materials have relatively long fibers which mat to form the open porous structure which is easily penetrated by the impregnating agent.

The selection of a suitable latex for impregnating the paper depends entirely on its end use. Typical uses include abrasive paper backings, drafting paper, backings for pressure sensitive tapes, labels, gaskets, backings for automotive door panels, protective papers for packaging, and as a base for the manufacture of artificial leather. In the shoe industry typical uses include insoles, midsoles, welting, heel pads, and plumper material.

One of the disadvantages inherent in the use of latex impregnated paper is that its tensile strength decreases sharply when the paper becomes wet. In the past the wet tensile strength of the impregnated paper has been improved by treating it with a non-aqueous solution of an organic isocyanate (e.g., an organic compound containing the terminal group —NCO). It is believed that the isocyanate groups react with the active hydrogen of the rubber and the cellulosic component of the paper to cross-link the rubber to the paper.

Isocyanates are very reactive compounds. Any active hydrogen compound will add to the nitrogen-carbon bond, the labile hydrogen bonding to the nitrogen atom. For example, alcohols yield urethanes as follows:

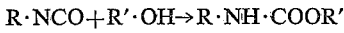

R·NCO+R'·OH→R·NH·COOR'

The use of a non-aqueous solution of an organic isocyanate is impractical since it requires large volumes of solvent and must be applied as a separate step in the process. The isocyanate, however, cannot be added to the latex because it will react at a fairly rapid rate with the active hydrogen present therein. It is a principal object of the present invention to provide a latex composition which imparts to the paper improved physical properties, particularly improved wet tensile strength, without the use of a separate isocyanate solution.

According to the present invention, the paper is impregnated in one step with a rubber latex containing an adduct of an isocyanate. The paper is heated to decompose the adduct and regenerate the isocyanate. It is believed that the regenerated isocyanate reacts with the rubber component of the latex and the cellulosic component of the paper. The exact nature of the reaction of these materials, however, is not completely understood. Substantially none of the reactivity of the isocyanate groups is lost prior to impregnation of the paper.

Briefly stated, the present invention provides a latex composition for improving the physical properties of porous cellulosic paper when said paper is impregnated therewith which comprises a rubber latex and an adduct of an isocyanate, said adduct being capable of decomposition into a form reactive with the rubber component of said latex and the cellulosic component of said paper.

The rubber component of the instant invention may be natural or synthetic rubber. The synthetic rubbers include homopolymers and copolymers of conjugated diolefins, i.e. polybutadiene, polyisoprene, butadiene-styrene copolymers, butadiene-acrylonitrile copolymers and polymeric forms of chlorine substitution products of conjugated diolefins, i.e. polychloroprene.

The adduct is the reaction product of an isocyanate and an active hydrogen compound. An active hydrogen compound may be defined as one containing a hydrogen which is normally replaceable with sodium. Any active hydrogen compound which will combine with the isocyanate to form a thermally decomposable adduct that is stable in water may be used. Representative of these active hydrogen compounds are hydrogen halides, amines, alcohols, phenols and sodium bisulfite.

An adduct of a polyfunctional isocyanate, i.e., a compound having more than one isocyanate terminal group, is preferred since the polyfunctional isocyanate is more effective than the monoisocyanate when compared on a weight basis. Typical examples of polyfunctional isocyanates are polymethylene diisocyanates: alkylene diisocyanates, e.g. propylene 1,2-diisocyanate; alkylidene diisocyanates; cycloalkylene diisocyanates; aromatic and substituted aromatic polyisocyanates, e.g. phenyl-1,4-diisocyanate, metatoluylene diisocyanate, toluene-2,4,6-triisocyanate; aliphatic-aromatic polyisocyanates, e.g. p.p′-diphenylmethane diisocyanate and p.p′p″-triphenylmethane triisocyanate.

For satisfactory results, the isocyanate adduct must be finely divided and well distributed in the latex. This may be accomplished by incorporating an aqueous dispersion or emulsion of the adduct into the latex. An aqueous dispersion, such as that produced by ball milling the adduct in the presence of water and a dispersing agent, is preferred since this procedure eliminates the use of organic solvents.

The proportion of isocyanate adduct in the latex is not critical and depends on the results desired. Satisfactory results are obtained in the proportion of about 0.05 to 10 parts for 99.45 to 89.5 parts of the rubber component of the latex. No appreciable benefits are obtained with amounts in excess of 10 parts of the adduct. Proportions used here and elsewhere herein refer to parts by weight unless otherwise stated.

The paper may be impregnated with the latex composition by any of the methods generally used, i.e., beater impregnation, wet web impregnation and dry web impregnation. In the beater impregnation method the latex is added to the paper-making slurry in the beater where the rubber is coagulated on the surface of the fibers and the paper is then formed from the slurry. In the wet web impregnation method excess water is removed from the paper web which is then passed through a bath of the latex. In the dry web impregnation method, the paper web is dried before being passed through a bath of the latex.

In carrying out the instant invention, the impregnated paper should be substantially dried at temperatures below the decomposition temperature of the isocyanate adduct to avoid migration of the impregnant to the surface of the paper. The dried paper is then heated to a temperature which will decompose the adduct to reactive form, i.e. regenerate the isocyanate. Temperatures above about 285° F. are generally necessary with heating time being largely dependent upon the weight and thickness of the paper.

The invention is further illustrated in the following examples. The physical properties of the impregnated paper were determined by the tests listed below:

*Conditioning of specimens prior to testing.*—The moisture content of all of the specimens of paper was standardized by hanging them in an atmosphere of 50 percent relative humidity at 72° F. for 2 hours prior to testing.

*Delamination resistance.*—The delamination resistance of the paper is the force in ounces required to continue the separation of a one inch wide strip of paper into two approximately equal plies, along the machine direction of the paper, after the separation has been started. The apparatus used was a spring scale delamination testing device and a press. The test specimens were cut to a length of approximately 10 inches in the machine direction and a width of approximately 2 inches in the cross direction of the paper. A 9 inch long by 1.5 inch wide strip of rug binding tape ("Permacel P507") was placed one each side of a test specimen so that approximately 0.5 inch of paper extended beyond each end of the tape. Two such specimens were prepared for each test. The two specimens were placed, side by side, on the bottom platen of the press so that approximately 0.5 inch of tape extended beyond each end of the platen. The specimens were pressed for 30 seconds at 275° F. at a pressure of 5.12 p.s.i. The specimens were removed from the press, allowed to cool to room temperature and then cut into strips exactly 1.0 inch wide. The two adjacent ends of the rug binding tape on each specimen were pulled apart until the paper began to separate into two approximately equal plies. The separated ends of the rug binding tape were clamped in the jaws of the spring scale delamination tester and the force required to separate the paper after the first one inch of separation was measured. The average of two specimens is reported.

*Tensile strength.*—The tensile strength of the paper is the force in pounds required to cause failure of a strip of paper 1 inch wide by 4 inches long at an increasing rate of elongation of 12 inches per minute. The apparatus used was a Thwing-Albert Electro-Hydraulic Tensile Tester, Model No. 37-4, with a four-inch initial gap between the jaws. The test specimens were cut to a length of approximately 10 inches in the direction to be tested and a width of exactly 1.0 inch. To test the wet tensile strength, the specimens were soaked in water at room temperature for 5 minutes. The tensile strength is reported in pounds per 1 inch strip. All tests were run in the machine direction of the paper. The average of three specimens is reported.

*Elongation.*—The elongation is reported as elongation at break in percentage elongation. Values higher than 40 are reported as 40+.

*Internal tearing resistance.*—The internal tearing resistance of the paper is the force in grams required to tear a single sheet of paper 68.8 centimeters after the tear has been started. The apparatus used was a Thwing-Albert Elmendorf Tearing Tester. The test specimens were cut in each principal direction of the paper to a length of approximately three inches and a width of exactly 63 millimeters. All tests were run in the cross direction of the paper. The average of three specimens is reported.

*Edge tearing strength.*—The edge tearing strength of the paper is the force in pounds required to tear a one inch wide strip of paper simultaneously at opposite edges of the strip by means of a thin V-notched beam held in a stirrup which is fastened in one of the clamps of a paper tensile tester. The apparatus used was a Scott Tensile Tester, Model X-3, and a Finch Edge Tear Stirrup. The stirrup was clamped in the lower jaw of the tensile tester, and the jaw positioned so that the distance between the beam and the lower edge of the upper jaw was 3.5 inches. Test specimens were cut to a length of approximately 10 inches in the opposite direction of the test and a width of exactly one inch. All tests were run in the cross direction of the paper. The average of three specimens is reported.

Example 1

An aqueous dispersion of the bisphenol adduct of methylenebis (4-phenylisocyanate) ("Hylene MP") was prepared by ball milling the following ingredients for 48 hours: 100 parts of adduct, 30 parts of a 10 percent aqueous solution of polymerized sodium salts of alkylnaphthalene sulphonic acids ("Daxad 11"), 30 parts of a 10 percent aqueous solution of ammonium caseinate, 10 parts of a 5 percent aqueous solution of dioctyl sodium sulphosuccinate ("Aerosol OT"), and 80 parts of a 1 percent aqueous solution of sodium o-phenylphenate ("Dowicide A").

The dispersion was added to a butadiene (72 percent)-acrylonitrile (28 percent) copolymer latex ("Hycar 1562x105") along with 0.5 part by weight (dry) of a stabilizer, i.e., the tetrasodium salt of ethylenediamine tetra acetic acid ("Perma Kleer 100"), and stirred. A number of such adduct-containing latex compositions were formed with the amount of adduct in each composition varying from 0.5 to 10 parts by weight (dry). For control purposes, a composition was prepared without the adduct dispersion. Each composition contained 100 parts by weight of solids (dry) and was adjusted to a 33 percent total solids concentration by the addition of water.

The impregnating paper was a semi-bleached kraft crepe paper ("Duracel 301M") containing no wet strength agent. It had a basis weight of 30 lbs. per ream of 480 sheets, 24 inches by 36 inches in size.

The paper was dipped into each of the latex compositions and passed through squeeze rolls to remove excess latex. It was impregnated to a level of 75 parts by weight of solids (dry) per 100 parts by weight of paper.

The impregnated paper was substantially dried at temperatures of 225° F. for about 10 minutes. It was then heated for one minute at 375° F. to decompose the adduct and regenerate the isocyanate.

Prior to being tested, the paper was conditioned at 50 percent relative humidity and 72° F. for 2 hours. The results of the tests are shown in Table I.

TABLE I

| Latex Composition, Parts by Weight (Dry) | | | Delamination Resistance (oz./inch of width) | Tensile Strength (lbs./inch of width) | Elongation (percent) | Internal Tearing Resistance (grams) | Wet Tensile Strength (lbs./inch of width) | Edge Tearing Strength (lbs./inch of width) |
|---|---|---|---|---|---|---|---|---|
| Butadiene (72%)-Acrylonitrile (28%) Copolymer Latex [1] | Adduct Additives [2] | Stabilizer [3] | | | | | | |
| 89.5 | 10.0 | 0.5 | 92 | 18.2 | 36.9 | 86.8 | 15.3 | 31.8 |
| 94.5 | 5.0 | 0.5 | 82.5 | 17.9 | 37.0 | 88.4 | 15.6 | 35.7 |
| 97.0 | 2.5 | 0.5 | 80 | 16.4 | 40+ | 96.0 | 14.2 | 37.1 |
| 98.0 | 1.5 | 0.5 | 80 | 16.3 | 37.2 | 98.8 | 13.9 | 31.8 |
| 99.0 | 0.5 | 0.5 | 80 | 15.9 | 40+ | 106 | 13.2 | 33.7 |
| 99.5 | None | 0.5 | 45 | 14.6 | 36.6 | 159 | 3 | 29 |

[1] ("Hycar 1562x105").
[2] Bisphenol adduct of methylenebis (4-phenylisocyanate) ("Hylene MP").
[3] Tetrasodium salt of ethylenediamine tetraacetic acid ("Perma Kleer 100").

As illustrated in Table I, the treatment of paper according to the instant invention with a latex composition containing as little as 0.5 part of adduct sharply increases its delamination resistance and wet tensile strength.

*Example II*

Latex compositions were formulated as described in Example I except that a butadiene (30 percent) styrene (70 percent) rubber latex ("Pliolite 170") was used.

The solids concentration of each composition was adjusted to give an impregnation level of 80 parts solids (dry) per 100 parts of paper.

Two types of impregnating paper, crepe and rope, were used. The crepe paper was the same as that described in Example I. The rope paper ("#4 mil Flexrope") was a flat paper and had a basis weight of 28.5 lbs. per ream of 480 sheets, 24 inches by 36 inches in size.

The paper was impregnated, dried, heated and conditioned as described in Example I. The results of the tests are shown in Table II.

*Example III*

Latex compositions were formulated as described in Example I. The amount of adduct in each adduct-containing composition varied from 0.05 to 1.0 part by weight (dry). The solids concentration of each composition was adjusted to give an impregnation level of 75 parts solids (dry) per 100 parts of paper.

The impregnating paper was the same as that described in Example I.

The paper was impregnated, dried, heated and conditioned as described in Example I. The results of the tests are shown in Table III.

TABLE III

| Latex Composition, Parts by Weight (Dry) | | | Delamination Resistance (oz./inch of width) | Tensile Strength (lbs./inch of width) | Elongation (percent) | Internal Tearing Resistance (grams) | Wet Tensile Strength (lbs./inch of width) |
|---|---|---|---|---|---|---|---|
| Butadiene (72%)-Acrylonitrile (28%) Copolymer Latex [1] | Adduct Additive [2] | Stabilizer [3] | | | | | |
| 98.5 | 1.0 | 0.5 | 85.5 | 19.0 | 33.4 | 78 | 17.3 |
| 99.0 | 0.5 | 0.5 | 83.0 | 17.3 | 37.6 | 82 | 15.7 |
| 99.25 | 0.25 | 0.5 | 66.5 | 17.6 | 34.3 | 104 | 14.7 |
| 99.4 | 0.1 | 0.5 | 56.0 | 16.8 | 36.8 | 106 | 11.4 |
| 99.45 | 0.05 | 0.5 | 49.5 | 17.4 | 35.2 | 118 | 9.3 |
| 99.5 | None | 0.5 | 44.0 | 16.2 | 29.4 | 118 | 3.4 |

[1] ("Hycar 1562x105").
[2] Bisphenol adduct of methylenebis (4-phenylisocyanate) ("Hylene MP").
[3] Tetrasodium salt of ethylenediamine tetra acetic acid ("Perma Kleer 100").

As noted in Table III, the treatment of paper with a latex composition containing as little as 0.05 part of isocyanate adduct will improve its wet tensile strength and delamination resistance.

*Example IV*

A number of latex compositions were formulated as described in Example I except that the isocyanate adduct was the reaction product of toluene 2,4-diisocyanate, phenol and trimethylol propane ("Mondur S"). The amount of adduct in each adduct-containing composition varied from 0.5 to 5.0 parts by weight (dry).

TABLE II

| Paper Type | Latex Composition, Parts by Weight (Dry) | | | Delamination Resistance (oz./inch of width) | Tensile Strength (lbs./inch of width) | Elongation (percent) | Internal Tearing Resistance (grams) | Wet Tensile Strength (lbs./inch of width) |
|---|---|---|---|---|---|---|---|---|
| | Butadiene (30%)-Styrene (70%) Copolymer Latex [3] | Stabilizer [4] | Adduct Additive [5] | | | | | |
| Crepe [1] | 98.5 | 0.5 | 1.0 | 59 | 22.4 | 15.6 | 68 | 19.8 |
| Do | 99.5 | 0.5 | None | 45.5 | 21.8 | 16.4 | 86 | 6.9 |
| Rope [2] | 98.5 | 0.5 | 1.0 | 52 | 54.7 | 6.8 | 96 | 44.6 |
| Do | 99.5 | 0.5 | None | 43.5 | 51.4 | 7.1 | 108 | 18.9 |

[1] ("Duracel 301M").
[2] ("#4 Flexrope").
[3] ("Pliolite 170").
[4] Tetrasodium salt of ethylenediamine tetraacetic acid ("Perma Kleer 100").
[5] Bisphenol adduct of methylenebis (4-phenylisocyanate) ("Hylene MP").

Table II shows that the treament of paper with a composition comprised of a low-butadiene high-styrene copolymer latex ("Pliolite 170") and an isocyanate adduct according to the instant invention improves its wet tensile strength and delamination resistance. As noted in Table II, the type of porous paper used for impregnation is not significant.

In addition, a latex composition was formulated as described in Example I and contained 1.0 part by weight of the bisphenol adduct of methylenebis (4-phenylisocyanate) ("Hylene MP").

The solids concentration of each composition was adjusted to give an impregnation level of 75 parts solids (dry) per 100 parts of paper. The impregnating paper was the same as that described in Example I.

The paper was impregnated, dried, heated and conditioned as described in Example I. The results of the tests are shown in Table IV.

were used. The crepe paper was the same as that described in Example I and the rope paper was the same as that described in Example II.

TABLE IV

| Latex Composition, Parts by Weight (Dry) | | | | Delamination Resistance (oz./inch of width) | Tensile Strength (lbs./inch of width) | Elongation (percent) | Internal Tearing Resistance (grams) | Wet Tensile Strength (lbs./inch of width) |
|---|---|---|---|---|---|---|---|---|
| Butadiene (72%)-Acrylonitrile (28%) Copolymer Latex [1] | Adduct Additive ("Modur S")[2] | Adduct Additive ("Hylene MP")[3] | Stabilizer [4] | | | | | |
| 99.5 | None | None | 0.5 | 46.0 | 16.3 | 32.7 | 128 | 4.8 |
| 98.5 | None | 1.0 | 0.5 | 78.0 | 17.9 | 32.5 | 77 | 16.2 |
| 99.0 | 0.5 | None | 0.5 | 55 | 17.7 | 40+ | 103 | 14.0 |
| 98.5 | 1.0 | None | 0.5 | 62 | 17.7 | 39.2 | 93 | 16.0 |
| 99.5 | 2.0 | None | 0.5 | 61 | 17.7 | 40+ | 96 | 16.9 |
| 94.5 | 5.0 | None | 0.5 | 70 | 18 | 40+ | 77 | 17.1 |

[1] ("Hycar 1562x105").
[2] Reaction product of toluene 2,4-diisocyanate, phenol and trimethylol propane ("Modur S").
[3] Bisphenol adduct of methylenebis (4-phenylisocyanate) ("Hylene MP").
[4] Tetrasodium salt of ethylenediamine tetra acetic acid ("Perma Kleer 100").

Table IV illustrates that the isocyanate adduct which is the reaction product of toluene 2,4-diisocyanate, phenol and trimethylol propane ("Modur S") is also effective in improving the wet tensile strength and delamination resistance of paper when used according to the instant invention.

The paper was impregnated, dried, heated and conditioned as described in Example I. The results of the tests are shown in Table V.

TABLE V

| Paper Type | Latex Composition | Delamination Resistance (oz./inch of width) | Tensile Strength (lbs./inch of width) | Elongation (percent) | Internal Tearing Resistance (grams) | Wet Tensile Strength (lbs./inch of width) | Edge Tearing Strength (lbs./inch of width) |
|---|---|---|---|---|---|---|---|
| Crepe | A (No Adduct) | 41.0 | 14.8 | 36.4 | 137 | 3.0 | 32.6 |
| Do | B | 70.5 | 17.4 | 40+ | 95.6 | 15.8 | 37.8 |
| Rope | A (No Adduct) | 52.0 | 50.4 | 9.1 | 253 | 13.5 | 19.0 |
| Do | B | 69.0 | 50.0 | 11.4 | 164 | 38.5 | 23.9 |

*Example V*

Two latex compositions were formulated to test the effectiveness of the isocyanate adduct with a blend of rubber latices. The formulations were as follows:

| | Parts by weight (Dry) | |
|---|---|---|
| | Composition A | Composition B |
| Butadiene (72%)-acrylonitrile (28%) copolymer latex ("Hycar 1562x105") | 69 | 66.5 |
| Butadiene (56-52%)-styrene (44-48%) copolymer latex ("Darex 622L") | 30 | 30 |
| Aqueous dispersion of 4,4'-thiobis-(6-tert-butyl-m-cresol) ("Santowhite Crystals") | 0.5 | 0.5 |
| Tetrasodium salt of ethylenediamine tetra acetic acid ("Perma Kleer 100") | 0.5 | 0.5 |
| Adduct Dispersion (Same as that used in Example I) | None | 2.5 |

Each composition was adjusted to a 33 percent total solids concentration by the addition of water to give an impregnation level of 75 parts by weight of solids (dry) per 100 parts by weight of paper.

Two types of impregnating paper, crepe and rope,

As noted in Table V the invention is operable with a mixture of rubber latices. Table V also shows that the type of porous paper used for impregnation is not significant.

*Example VI*

Latex compositions were formulated as described in Example I except that the latex was a butadiene (67 percent) acrylonitrile (33 percent) copolymer latex ("Hycar 1562x72").

The solids concentration of the composition with the adduct was adjusted to give an impregnation level of 49 parts by weight of solids (dry) per 100 parts by weight of paper. The solids concentration of the composition without the adduct was adjusted to give an impregnation level of 73 parts by weight of solids (dry) per 100 parts by weight of paper.

The paper used for impregnation was the same as that described in Example I.

The paper was impregnated, dried, heated and conditioned as described in Example I. The results of the tests are shown in Table VI.

TABLE VI

| Latex Composition, Parts by Weight (Dry) | | | Impregnation Level (Parts by weight solids per 100 parts by weight paper) | Delamination Resistance (oz./inch of width) | Tensile Strength (lbs./inch of width) | Elongation (percent) | Internal Tearing Resistance (grams) | Wet Tensile Strength (lbs./inch of width) | Edge Tearing Strength (lbs./inch of width) |
|---|---|---|---|---|---|---|---|---|---|
| Butadiene (67%)-Acrylonitrile (33%) Copolymer Latex [1] | Stabilizer [2] | Adduct Additive [3] | | | | | | | |
| 98.5 | 0.5 | 1.0 | 49 | 41.5 | 17.2 | 31.1 | 92.4 | 14.2 | 25.4 |
| 99.5 | 0.5 | None | 73 | 40.0 | 15.4 | 29.3 | 123 | 3.8 | 25.4 |

[1] ("Hycar 1562x72").
[2] Tetrasodium salt of ethylenediamine tetra acetic acid ("Perma Kleer 100").
[3] Bisphenol adduct of methylenebis (4-phenylisocyanate) ("Hylene MP").

Table VI illustrates that a latex containing an isocyanate adduct can be used in the instant invention in amounts significantly smaller than the same latex used alone to produce a paper with better delamination resistance and wet tensile strength.

Example VII

A number of latex compositions were prepared to determine the effectiveness of the bisphenol adduct of methylenebis (4-phenylisocyanate) ("Hylene MP") with various rubber latices in the instant invention. The latex compositions were formulated as described in Example I except that the latex was either a chloroprene (80 percent)-acrylonitrile (20 percent) copolymer latex ("Neoprene 450"), a butadiene (56–52 percent) styrene (44–48 percent) copolymer latex ("Darex 621L"), a butadiene (72 percent)-styrene (28 percent) copolymer latex ("Goodrite 3050A–15E") or a natural rubber latex ("Natural High Ammonia"). In addition, an aqueous dispersion of an antioxidant, i.e. 4,4'-thiobis-(6-tert-butyl-m-cresol) ("Santowhite Crystals") was added to each composition. A zinc oxide dispersion ("Vulcarite 101") was also included in the chloroprene (80 percent)-acrylonitrile (20 percent) copolymer latex composition. The formula for each composition is given in Table VII. The solids concentration of each composition was adjusted to give a particular impregnation level.

The paper used was the same as that described in Example I. It was impregnated, dried, heated and conditioned as described in Example I. The results of the tests are shown in Table VII.

Table VII shows that the instant invention is operable with a number of different rubber latices to produce a paper with improved delamination resistance and wet tensile strength.

Example VIII

Latex compositions were formulated as described in Example I except that the latex was a carboxy-modified butadiene (50 percent)-styrene (50 percent) rubber latex ("Naugatex 2755"). The rubber contained carboxyl groups in an amount equivalent to 1.5 to 2.0 percent acrylic acid by weight of the rubber. An aqueous dispersion of 1.5 parts of an antioxidant, i.e. 4,4' thiobis-(6-tert-butyl-m-cresol) ("Santowhite Crystals") was also added to each latex composition.

The formulation of each composition is given in Table VIII. The solids concentration of each composition was adjusted to give an impregnation level of 75 parts solids (dry) per 100 parts paper.

The paper used for impregnation was the same as that described in Example I. It was impregnated, dried, heated and conditioned as described in Example I. The results of the tests are shown in Table VIII.

TABLE VIII

| Latex Composition, Parts by Weight (Dry) | | | | Delamination Resistance (oz./inch of width) | Tensile Strength (lbs./inch width) | Elongation (percent) | Internal Tearing Resistance (grams) | Wet Tensile Strength (lbs./inch of width) | Edge Tearing Strength (lbs./inch of width) |
|---|---|---|---|---|---|---|---|---|---|
| Carboxy-Modified Butadiene (50%)-Styrene (50%) Copolymer Latex [1] | Stabilizer [2] | Adduct Additive [3] | Antioxidant [4] | | | | | | |
| 98.0 | 0.5 | None | 1.5 | 41.5 | 23.1 | 22.6 | 88 | 5.4 | 16.9 |
| 97.0 | 0.5 | 1.0 | 1.5 | 61.2 | 24.0 | 19.1 | 70 | 18.0 | 11.4 |

[1] ("Naugatex 2755").
[2] Tetrasodium salt of ethylenediamine tetra acetic acid ("Perma Kleer 100").
[3] Bisphenol adduct of methylenebis (4-phenylisocyanate) ("Hylene MP").
[4] 4,4'-thiobis-(6-tert-butyl-m-cresol) ("Santowhite Crystals").

Table VIII illustrates that the instant invention is operable with carboxy-modified latices.

TABLE VII

| Latex Composition | Chloroprene (80%)-Acrylonitrile (20%) Copolymer Latex [1] | Butadiene (56–52%)-Styrene (44–48%) Copolymer Latex [2] | Butadiene (72%)-Styrene (28%) Copolymer Latex [3] | Natural Rubber Latex [4] | Zinc Oxide [5] | Antioxidant [6] | Stabilizer [7] | Adduct Additive [8] |
|---|---|---|---|---|---|---|---|---|
| A | 91.5 | | | | 5.0 | 2.0 | 0.5 | 1.0 |
| B | 92.5 | | | | 5.0 | 2.0 | 0.5 | None |
| C | | 97.0 | | | | 1.5 | 0.5 | 1.0 |
| D | | 98.0 | | | | 1.5 | 0.5 | None |
| E | | | 97.0 | | | 1.5 | 0.5 | 1.0 |
| F | | | 98.0 | | | 1.5 | 0.5 | None |
| G | | | | 97.5 | | 1.0 | 0.5 | 1.0 |
| H | | | | 98.5 | | 1.0 | 0.5 | None |

| Latex Composition | Impregnation Level (Parts by weight solids per 100 parts by weight paper) | Delamination Resistance (oz./inch of width) | Tensile Strength (lbs./inch of width) | Elongation (percent) | Internal Tearing Resistance (grams) | Wet Tensile Strength (lbs./inch of width) |
|---|---|---|---|---|---|---|
| A | 75 | 57.0 | 26.2 | 23.8 | 87 | 17.4 |
| B | 75 | 41.0 | 24.7 | 26.1 | 102 | 10.0 |
| C | 75 | 42.0 | 25.0 | 25.4 | 109 | 17.6 |
| D | 75 | 37.5 | 22.5 | 26.2 | 144 | 3.1 |
| E | 75 | 37.0 | 13.9 | 25.6 | 166 | 10.1 |
| F | 75 | 29.0 | 10.0 | 26.0 | 204 | 1.3 |
| G | 81 | 40.5 | 23.5 | 22.5 | 271 | 15.7 |
| H | 83 | 36 | 21.2 | 22.2 | 252 | 8.7 |

[1] ("Neoprene 450").
[2] ("Darex 621L").
[3] ("Goodrite 3050A–15E").
[4] ("Natural High Ammonia").
[5] ("Vulcarite 101").
[6] 4,4'-thiobis-(6-tert-butyl-m-cresol) ("Santowhite Crystals").
[7] Tetrasodium salt of ethylenediamine tetra acetic acid ("Perma Kleer 100").
[8] Bisphenol adduct of methylenebis (4-phenylisocyanate) ("Hylene MP").

Example IX

Latex compositions were formulated as described in Example I except that a butyl rubber latex ("Butyl Latex 90–01") was used. The rubber contained 1.5 to 2.0 mole percent unsaturation. An aqueous dispersion of 1.0 part of an antioxidant, i.e. 4,4′-thiobis-(6-tert-butyl-m-cresol) ("Santowhite Crystals") was also added to each composition. The formula of each composition is given in Table IX.

The solids concentration of each composition was adjusted to give an impregnation level of 50 parts solids (dry) per 100 parts paper.

The paper used for impregnation was the same as that described in Example I. It was impregnated, dried, heated and conditioned as described in Example I. The results of the tests are shown in Table IX.

Table IX shows that paper treated with a butyl rubber

The formula of the impregnant and the particular steps employed in preparing each sample of the impregnated paper are listed in Table X.

The adduct dispersion was the same as that described in Example I. The latex was a butadiene (67 percent) acrylonitrile (33 percent) copolymer latex ("Hycar 1562x72").

The paper was the same as that used in Example I and was impregnated in a manner similar to that described in Example I. When the adduct dispersion alone was used to impregnate the paper in a separate step, the impregnation level was 0.75 part by weight of the adduct (dry) per 100 parts of paper. Samples 3 through 8 (the latex included the stabilizer) were impregnated to a level of 75 parts of solids (dry) per 100 parts of paper. After each impregnation step, the paper was substantially dried at temperatures of about 225° F. for about 10 minutes. The instant invention is illustrated by Sample 8.

TABLE IX

| Latex Composition, Parts by Weight (Dry) | | | | Delamination Resistance (oz./inch of width) | Tensile Strength (lbs./inch of width) | Elongation (percent) | Internal Tearing Resistance (grams) | Wet Tensile Strength (lbs./inch of width) |
|---|---|---|---|---|---|---|---|---|
| Butyl Rubber Latex [1] | Antioxidant [2] | Stabilizer [3] | Adduct Additive [4] | | | | | |
| 98.5 | 1.0 | 0.5 | ---- | 36.5 | 13.2 | 23.4 | 246 | 1.0 |
| 97.5 | 1.0 | 0.5 | 1.0 | 36.0 | 14.0 | 24.5 | 210 | 2.4 |
| 93.5 | 1.0 | 0.5 | 5.0 | 37.3 | 14.5 | 21.4 | 200 | 1.5 |

[1] ("Butyl Latex 90–01").
[2] 4,4′-thiobis-(6-tert-butyl-m-cresol) ("Santowhite Crystals").
[3] Tetrasodium salt of ethylenediamine tetra acetic acid ("Perma Kleer 100").
[4] Bisphenol adduct of methylenebis (4-phenylisocyanate) ("Hylene MP").

latex containing an isocyanate adduct in accordance with this invention produces only a slight improvement in delamination resistance and wet tensile strength.

Prior to being tested, all of the samples were conditioned at 50 percent relative humidity and 72° F. for 2 hours. The results of the tests are shown in Table X.

TABLE X

| Sample | Process Steps | Latex Composition, Parts by Weight (Dry) | | | Delamination Resistance (oz./inch of width) | Tensile Strength (lbs./inch of width) | Elongation (percent) | Internal Tearing Resistance (grams) | Wet Tensile Strength (lbs./inch of width) |
|---|---|---|---|---|---|---|---|---|---|
| | | Butadiene (67%)-Acrylonitrile (33%) Copolymer Latex [1] | Stabilizer [2] | Adduct Additive [3] | | | | | |
| 1 | (a) Impregnated with adduct dispersion. | | | 1.0 | | 12.0 | 16.6 | 110 | 0.8 |
| 2 | (a) Impregnated with adduct dispersion. (b) Heated for 1 min. at 350° F. | | | 1.0 | | 10.5 | 17.7 | 125 | 2 |
| 3 | (a) Impregnated with adduct dispersion. (b) Heated for 1 min. at 375° F. (c) Impregnated with latex. (d) Heated for 1 min. at 375° F. | 99.5 | 0.5 | 1.0 | 62.0 | 21.9 | 36.6 | 116 | 18.4 |
| 4 | (a) Impregnated with adduct dispersion. (b) Impregnated with latex. (c) Heated for 1 min. at 375° F. | 99.5 | 0.5 | 1.0 | 59.0 | 22.1 | 34.2 | 97 | 19.6 |
| 5 | (a) Impregnated with adduct dispersion. (b) Heated for 1 min. at 375° F. (c) Impregnated with Latex. | 99.5 | 0.5 | 1.0 | 54.0 | 18.3 | 32.3 | 158 | 10.3 |
| 6 | (a) Impregnated with adduct dispersion. (b) Impregnated with latex. | 99.5 | 0.5 | 1.0 | 50.5 | 17.1 | 33.7 | 151 | 7.5 |
| 7 | (a) Impregnated with latex. (b) Heated for 1 min. at 375° F. | 99.5 | 0.5 | ---- | 43.0 | 19.0 | 27.8 | 148 | 3.5 |
| 8 | (a) Impregnated with latex containing adduct. (b) Heated for 1 min. at 375° F. | 98.5 | 0.5 | 1.0 | 64.0 | 21.5 | 31.5 | 94 | 20.2 |

[1] ("Hycar 1562x72").
[2] Tetrasodium salt of ethylenediamine tetra acetic acid ("Perma Kleer 100").
[3] Bisphenol adduct of methylenebis (4-phenylisocyanate) ("Hylene MP").

Example X

Processing steps were varied in this example to determine their effect on the physical properties of the paper, Table X illustrates that paper impregnated with both the adduct and the latex and heated to the decomposition temperature of the adduct has the best physical properties. Paper treated according to the instant invention (Sample 8) showed the highest delamination resistance and wet tensile strength.

We claim:

1. A method for improving the physical properties of porous cellulosic paper when the paper is impregnated therewith which comprises impregnating the paper with a composition consisting essentially of a rubber latex and a thermally decomposable adduct of an isocyanate, said adduct being present at a level of about 0.05 to 10 parts by weight per 99.45 to 89.5 parts by weight of said rubber latex, solids basis, substantially drying the paper at temperatures below the decomposition temperature of said adduct, and heating the paper to at least the decomposition temperature of said adduct.

2. A method for improving the physical properties of porous cellulosic paper when the paper is impregnated therewith which comprises impregnating the paper with a composition consisting essentially of a rubber latex wherein the rubber component is selected from the group consisting of butadiene-styrene copolymers, butadiene-acrylonitrile copolymers, chloroprene-acrylonitrile copolymers, natural rubber and carboxy-modified butadiene-styrene copolymers; and a thermally decomposable adduct of an isocyanate, said adduct being present at a level of about 0.5 to 10 parts by weight per 99.45 to 89.5 parts by weight of said rubber latex, solids basis, substantially drying the paper at temperatures below the decomposition temperature of said adduct, and heating the paper to at least the decomposition temperature of the adduct.

3. The method of claim 1 wherein the rubber latex is comprised of a polymer of butadiene.

4. The method of claim 1 wherein the rubber latex is comprised of a polymer of chloroprene.

5. The method of claim 1 wherein the rubber latex is comprised of a natural rubber.

6. The method of claim 1 wherein the rubber latex is comprised of a carboxy-modified butadiene polymer.

7. The method of claim 1 wherein the adduct is the bisphenol adduct of methylenebis (4-phenylisocyanate).

8. The method of claim 1 wherein the adduct is the reaction product of toluene 2,4-diisocyanate, phenol and trimethylol propane.

References Cited by the Examiner
UNITED STATES PATENTS

| | | | |
|---|---|---|---|
| 2,033,486 | 3/1936 | Schur. | |
| 2,558,634 | 6/1951 | Uber | 117—155 |
| 2,650,163 | 8/1953 | Horsey et al. | 162—169 |
| 2,724,707 | 11/1955 | Brown | 260—80.7 |
| 2,826,526 | 3/1958 | Meyrick et al. | 156—331 |
| 2,835,652 | 5/1958 | Haven. | |
| 2,994,671 | 8/1961 | Thompson. | |
| 2,994,672 | 8/1961 | Geerdes. | |

WILLIAM D. MARTIN, *Primary Examiner.*

T. G. DAVIS, *Examiner.*